United States Patent
Derie

[11] Patent Number: 6,132,355
[45] Date of Patent: Oct. 17, 2000

[54] ASH INERTING METHOD

[75] Inventor: René Derie, Brussels, Belgium

[73] Assignee: Solvay (Societe Anonyme), Brussels, Belgium

[21] Appl. No.: 09/125,540

[22] PCT Filed: Feb. 18, 1997

[86] PCT No.: PCT/EP97/00778

§ 371 Date: Apr. 16, 1999

§ 102(e) Date: Apr. 16, 1999

[87] PCT Pub. No.: WO97/31874

PCT Pub. Date: Sep. 4, 1997

[30] Foreign Application Priority Data

Feb. 28, 1996 [BE] Belgium ............................ 9600170
Sep. 11, 1996 [BE] Belgium ............................ 9600763

[51] Int. Cl.$^7$ ............................ C04B 18/10; C04B 28/04; A62D 3/00
[52] U.S. Cl. ................... 588/257; 588/252; 106/DIG. 1
[58] Field of Search ...................... 588/249, 251, 588/252, 256, 257, 259; 405/128, 129; 106/705, DIG. 1

[56] References Cited

U.S. PATENT DOCUMENTS

| | | | |
|---|---|---|---|
| 4,226,630 | 10/1980 | Styron | 106/DIG. 1 |
| 4,737,356 | 4/1988 | O'Hara et al. | |
| 4,911,757 | 3/1990 | Lynn et al. | 106/DIG. 1 |
| 5,037,479 | 8/1991 | Stanforth | 588/257 |
| 5,041,398 | 8/1991 | Kauser et al. | 106/DIG. 1 |
| 5,130,051 | 7/1992 | Falk | 588/257 |
| 5,284,636 | 2/1994 | Goff et al. | 588/256 |
| 5,429,751 | 7/1995 | Hooykaas | 210/751 |
| 5,973,220 | 10/1999 | Sasaki et al. | 588/257 |

FOREIGN PATENT DOCUMENTS

| | | |
|---|---|---|
| 0534231A1 | 3/1993 | European Pat. Off. |
| 0572813A1 | 8/1993 | European Pat. Off. |
| 0568903A1 | 11/1993 | European Pat. Off. |
| 05282008A1 | 2/1994 | European Pat. Off. |
| 2277515A | 11/1994 | United Kingdom |
| 96/20049 | 7/1996 | WIPO |

OTHER PUBLICATIONS

"Heavy Metals in Wastewater and Sludge Treatment Processes" by J. Lester. vol. 1, p. 2.
"Solidification/Stabilization of Heavy Metal Sludgy by a Portland Cement/Fly Ash Binding Mixture" by A. Roy et al.

*Primary Examiner*—David Bagnell
*Assistant Examiner*—Frederick L. Lagman
*Attorney, Agent, or Firm*—Venable

[57] ABSTRACT

Process for rendering ash inert, according to which a reactant selected from phosphoric acid and alkali metal phosphates is added to the ash, the phosphate-containing mixture thus obtained is subjected to puddling with water and a hydraulic binder so as to form a hydraulic mortar, and the mortar is subjected to setting and hardening.

11 Claims, 1 Drawing Sheet

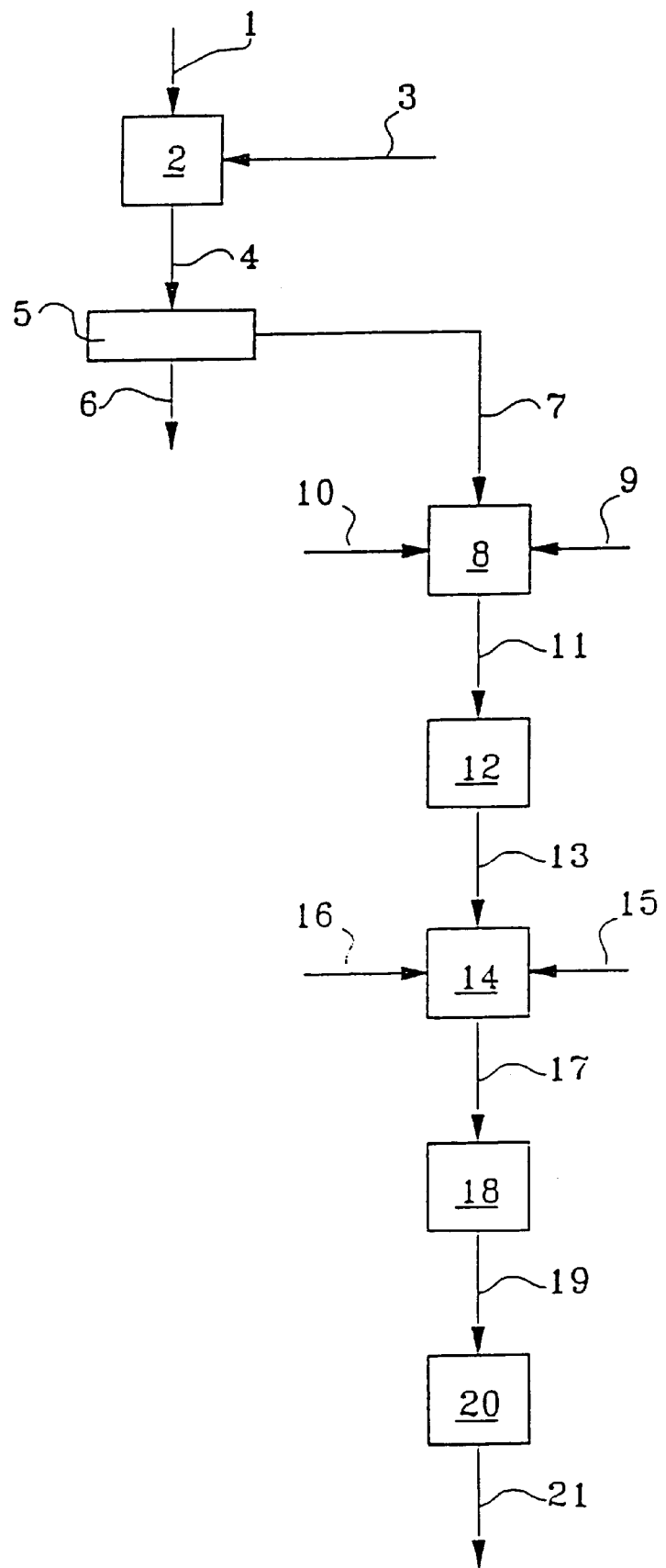

ASH INERTING METHOD

The present invention relates to a process for rendering ash inert, in particular fly ash from urban incinerator smoke.

Urban incinerators (which are used to destroy household waste and/or hospital waste) produce occasionally considerable volumes of fly ash. The mineralogical composition of this ash hardly varies at all, irrespective of its origin, and alkali metal chlorides (NaCl and KCl), anhydrite, quartz, vitrified aluminosilicates, other relatively chemically inert oxidized residues (including $SnO_2$), heavy metals (in particular zinc, lead, cadmium, mercury and chromium), organochlorine derivatives and noncombusted material are generally found therein, albeit in proportions which may range from unity to twofold, or even more. Aluminium metal is often found among the noncombusted material.

The presence of water-soluble substances, heavy metals and toxic organic material (dioxins, furans) may pose difficulties for the disposal of this fly ash and involves rendering them inert in a prior process intended to make them harmless to the environment.

Various processes have been suggested in order to render urban incinerator ash inert, these processes being directed towards stabilizing the heavy metals, mainly lead and cadmium. According to one of these processes (American U.S. Pat. No. 4,737,356), fly ash is treated with a water-soluble phosphate and lime so as to insolubilize the heavy metal ions in the form of metal phosphates. According to a similar process (European patent application EP-A-568,903), ash is treated with water and phosphate ions so as to adjust the pH to 6.9 and to insolubilize the heavy metals in the form of metal phosphates, the excess phosphate ions are bound by trivalent aluminium or iron ions and the reaction medium is basified with quicklime, CaO. According to European patent application EP-A-534,231, fly ash collected from a purification treatment of acidic fumes with lime are simply calcined at high temperature (between 375 and 800° C.).

With the known processes which have just been described, the inert products formed are powders, which may pose difficulties for their handling and storage. One means of circumventing this difficulty consists in eliminating the fly ash in hydraulic mortars, with which solid, inert blocks are formed. To this end, in a known process for rendering a sludge contaminated with heavy metals inert, the sludge is mixed with Portland cement and fly ash so as to form a solid, compact and inert block (Roy A. Heaton H. C., Cartledge F. K. and Tittlebaum M. E. "Solidification/Stabilization of a Heavy Metal Sludge by a Portland Cement/Fly Ash Binding Mixture"—Hazardous Waste & Hazardous Material, Vol. 8, No. 1, 1991, pages 33–41). When applied to fly ash from smoke generated by incineration of urban waste in order to render it inert, this known process is not always satisfactory as the blocks obtained in this case are expanded by the presence of a large number of gaseous inclusions, thereby considerably increasing their volume and bulk and making them crumbly and relatively nonresistant to compression.

The invention is directed towards overcoming the abovementioned drawbacks of the known processes, by providing a process which efficiently renders inert ash comprising heavy metals and noncombusted aluminium metal, in solid, compact blocks which have good mechanical properties. The invention is also directed in particular towards providing a process which makes it possible to remove fly ash from urban incinerator smoke, in compact, non-expanded blocks which have good compression strength and satisfy the standardized toxicity tests, in particular the TCLP ("Toxicity Characteristic Leaching Procedure", USA) toxicity test.

Consequently, the invention relates to a process for rendering ash containing heavy metals and aluminium metal inert, which process is characterized in that a reactant selected from phosphoric acid and alkali metal phosphates is added to the ash, the phosphate-containing mixture thus obtained is subjected to puddling with water and a hydraulic binder so as to form a hydraulic mortar, and the mortar is subjected to setting and hardening.

The expression "heavy metals" is understood to refer to metals whose density is at least equal to 5 $g/cm^3$, as well as beryllium, arsenic, selenium and antimony, in accordance with the generally accepted definition (Heavy Metals in Wastewater and Sludge Treatment Processes; Vol. I, CRC Press, Inc; 1987; page 2).

In the process according to the invention, a reactant selected from phosphoric acid and phosphates of alkali metals (preferably of sodium) is used. Orthophosphoric acid and sodium hexametaphosphate are suitable for use.

Addition of the abovementioned reactant to the ash must be performed in the presence of an amount of water which is sufficient to allow a homogeneous reaction mixture to be prepared quickly, by simple blending. Although not wishing to be bound by a theoretical explanation, the inventor believes that one of the difficulties encountered, before the invention, in order to remove fly ash from urban incinerators into hydraulic mortars was attributable in particular to the presence of aluminium metal in this ash. In the process according to the invention, the function of the abovesaid reactant is to convert the aluminium metal into aluminium phosphate. The amount of reactant which it is necessary to use will consequently depend on the mineralogical composition of the ash, in particular on its content of aluminium metal and of heavy metals, and it must be determined in each particular case by a routine laboratory operation. In practice, amounts by weight of from 5 to 25% (preferably of from 8 to 15%) of the said reactant relative to the weight of the ash are suitable.

The water and the hydraulic binder must be used in amounts which are suitable for forming a hydraulic mortar with the phosphate-containing mixture. It is important to perform efficient blending of the phosphate-containing mixture with the water and the hydraulic binder, so as to produce a hydraulic mortar of homogeneous composition. After the blending, the mortar is subjected to maturation in order to bring about its setting and hardening. Before subjecting it to the setting and hardening, the mortar must be shaped into a suitable form which allows efficient storage and handling, for example in the form of bricks, prismatic blocks or spherical pellets. The setting and hardening may be performed under a humid or dry atmosphere. They are generally performed in the presence of atmospheric air.

The hydraulic binder is advantageously selected from Portland cement and Portland cement clinker. Although Portland cement affords good results, Portland cement clinker is preferred.

The amount of hydraulic binder to be used will depend on various parameters, in particular on the hydraulic binder selected, the composition of the ash and the desired properties for the products collected from the inerting process, in particular their mechanical strength and their behaviour in toxicity tests (for example the TCLP test defined above). In practice, it is recommended to use a weight amount of hydraulic binder which is greater than 10% (preferably at least equal to 20%) of the weight of the ash. There is no advantage in the weight of the hydraulic binder used exceeding 100% (generally 50%) of the weight of the ash. Weight amounts of hydraulic binder which are between 20

(preferably 25) % and 50 (preferably 40) % of the weight of the ash are especially recommended.

After the setting and hardening treatment, which may last for several days, a solid, compact mass is recovered, which is substantially inert with respect to atmospheric agents and satisfies the toxicity standards, in particular those defined by the TCLP test defined earlier. The form of this solid mass is that into which the mortar was shaped and it may, for example, comprise spherical or prismatic bricks or blocks. It is compact, substantially free of gaseous inclusions and consequently has good mechanical properties, in particular a hardness, an impact strength and an abrasion strength which are sufficient to allow its handling and storage without difficulty.

In one advantageous embodiment of the process according to the invention, the setting and hardening of the mortar are performed under a humid atmosphere, preferably one saturated with water vapour. This embodiment of the process according to the invention proved to be especially advantageous in the case of ash containing hexavalent chromium for it has been observed that, all other things being equal, it substantially improves the inertness of the chromium in the solid mass recovered after the process.

In another advantageous embodiment of the process according to the invention, an additive selected from iron, manganese, iron(II) compounds, manganese(II) compounds and reductive salts of alkali metals (preferably of sodium) is incorporated into the puddling water in an amount by weight of from 0.3 to 1% of the weight of the mortar. In this embodiment of the invention, the additive is advantageously selected from ferrous sulphate, manganous sulphate, sodium nitrite, sodium sulphite and iron metal.

The source of the ash is not critical when applying the process according to the invention. The invention is, however, especially suited to fly ash recovered from urban incinerator smoke, such as domestic waste incinerators and hospital waste incinerators.

The fly ash from smoke generated by urban incinerators usually comprises, in addition to heavy metals and aluminium metal, undesirable organic material (in particular organochlorine materials such as dioxins, and furans), water-soluble compounds, for example alkali metal chlorides, and noncombusted material.

In one particular embodiment of the process according to the invention, in the case where the ash contains water-soluble compounds, it is subjected to washing with alkaline water, before addition of the abovementioned reactant thereto, which is selected from phosphoric acid and alkali metal phosphates. In this embodiment of the process according to the invention, the aim of washing the ash with water is to remove the water-soluble compounds therefrom, in particular the sodium and potassium salts (mainly sodium chloride, potassium chloride and sodium sulphate) and some of the anhydrite. For the washing of the ash, it is necessary to use an alkaline water, so as to insolubilize the heavy metals. In practice, the washing of ash (in particular the pH of the water used and the duration of the contact between the water and the ash) must be controlled such that the aqueous medium collected from the washing is alkaline and preferably has a pH value of greater than 8, values at least equal to 9.5 being recommended. In this way, solubilization of the heavy metals is avoided, these heavy metals consequently remaining in the residual solid phase recovered from the washing. If need be, it may prove necessary to add a reactant to the washing water in order to bring the pH to the desired value, for example lime. After the washing, an aqueous suspension is recovered which is subjected to filtration or to an equivalent mechanical separation (for example sedimentation or centrifugation) in order to separate the undissolved solid material therefrom, to which material is then added the abovementioned reactant, in accordance with the process according to the invention.

In another embodiment of the process according to the invention, in the case where the ash contains organic and/or noncombusted material, the abovementioned phosphate-containing mixture is subjected to calcination before the water and the hydraulic binder are added thereto. In this embodiment of the process according to the invention, the calcination is performed under an oxidizing atmosphere (generally in ambient air). The aim of this process is to destroy the noncombusted material and to remove the organic material. The calcination is generally performed at a temperature above 600° C., preferably at least equal to 700° C. An excessive temperature should be avoided, the result of which would be to vaporize some of the heavy metals. In practice, the calcination temperature is preferably below 1000° C. and, advantageously, it does not exceed 800° C. Temperatures of from 600 to 800° C. are especially recommended.

The invention is illustrated by the following description of the single FIGURE in the attached drawing, which shows a diagram of a plant using one particular embodiment of the process according to the invention.

The plant represented schematically in the FIGURE is intended to render ash 1 inert, this ash comprising heavy metals, aluminium metal, water-soluble compounds, organic material and noncombusted material. It comprises a washing chamber 2 into which the ash 1 and water 3 are introduced. The amount of water 3 introduced into the chamber 2 is controlled so as to dissolve all of the water-soluble compounds in the ash 1, in particular the sodium chloride, potassium chloride and sodium sulphate. A pH value of greater than 8, for example of from 9.5 to 14, is moreover produced in the chamber 2, so as to insolubilize the heavy metals. If need be, hydrochloric acid or sodium hydroxide is added to the washing water 3 in order to produce the desired pH value.

An aqueous suspension 4 is recovered from the washing chamber 2, which suspension is treated immediately on a filter 5. The filtrate 6 is discarded and the filter cake 7 is recovered and sent to a reaction chamber 8. In the reaction chamber 8, an amount of phosphoric acid 9 and of water 10, which is sufficient to form, by blending, a pumpable mass 11 in which all of the aluminium metal from the ash is in the form of aluminium orthophosphate, is added to the filter cake 7 (as a variant, some or all of the phosphoric acid is replaced by an alkali metal phosphate, preferably sodium hexametaphosphate). The pumpable mass is withdrawn from the reaction chamber 2 and is introduced into a calcination oven 12, where it is heated at a temperature of 700 to 800° C. for a period which is sufficient to decompose the organic material and to destroy the noncombusted material. The calcined material 13 extracted from the oven 12 is transferred into a blending chamber 14, where water 15 and a hydraulic binder 16 (for example Portland cement clinker) are added thereto in controlled amounts in order to form, by blending with the calcined material 13, a hydraulic mortar. The hydraulic mortar 17 recovered from the blending chamber 14 is treated in a rotating drum 18 in order to shape it in the form of small pellets 19 which are stored for several days in a hermetically closed vessel 20 filled with air substantially saturated with water vapour, at an ambient temperature of about 20° C. and at atmospheric pressure. The duration of the maturation treatment in the vessel 20 is controlled so as to set and harden fully the mortar pellets 19. After the maturation treatment in the vessel 20, hard, compact pellets 21 are collected therefrom, which pellets are inert with respect to the environment and atmospheric agents, such that they can be removed to a waste product dumping ground.

The examples whose description follows will demonstrate the value of the invention.

First Series of Tests

In Examples 1 to 5 whose description follows, ash taken from a domestic waste incinerator was treated. The composition by weight of the ash is given in Table 1 below.

TABLE 1

| Constituent | Content by weight |
| --- | --- |
| $SiO_2$ | 30.6% |
| Al (total) (expressed as $Al_2O_3$) | 16.7% |
| Al metal | 1–10% of total Al |
| CaO | 22.0% |
| MgO | 2.5% |
| Na | 3.7% |
| K | 2.6% |
| $TiO_2$ | 2.4% |
| FeO | 3.0% |
| Zn | 1.00% |
| Pb | 0.38% |
| Cu | 0.10% |
| Cd | 0.008% |
| Mn | 0.09% |
| Cr (total) | 0.07% |
| Cr(VI) | 13 ppm |
| Cl | 2.2% |
| $SO_3$ | 9.6% |
| $P_2O_5$ | 1.2% |
| As | 65 ppm |
| Sb | 345 ppm |
| Hg | 1.1 ppm |
| Noncombusted material | 0.4% |

EXAMPLE 1

(Not in Accordance with the Invention)

108 g of ash are washed with 1000 ml of water. After one hour, the pH of the reaction medium stabilized at 10.9. The aqueous suspension thus formed was filtered and the filter cake was collected, after first washing it with 100 ml of water.

A sufficient amount of water to form a malleable paste containing approximately 40% water was added to the filter cake. 11.8 g of aqueous phosphoric acid solution (concentration: 85% by weight) were added to the resulting paste, while keeping the paste under constant stirring. The addition of phosphoric acid was accompanied by a moderate release of heat. The homogeneous pasty mass thus obtained was placed in a refractory porcelain capsule, which was introduced into a cold oven. The oven was then heated in order to bring its temperature gradually to 800° C., over the course of about one hour. This temperature of 800° C. was maintained for one hour and the material was then removed from the oven and allowed to cool to room temperature.

The calcined powder collected from the oven was subjected, without further treatment, to a test of toxicity according to the TCLP standard defined above. To this end, 2 l of an aqueous solution containing 6 g of acetic acid and 2.57 g of sodium hydroxide per liter were added to 100 g of the calcined powder. The mixture was homogenized and then filtered through a filter of 0.6 to 0.8 μm glass fibres and the filtrate was measured for its content of heavy metals from the powder subjected to the test.

The results are given in Table 2 below.

TABLE 2

| Heavy metal | Content (μg/l) |
| --- | --- |
| Cu | 1000 |
| Pb | 2900 |
| Zn | 15000 |
| Cd | 300 |
| As | 500 |
| Sb | 700 |
| Cr(VI) | 5100 |
| Hg | 10 |

EXAMPLE 2

(In Accordance with the Invention)

A batch of the ash defined in Table 1 was treated as in Example 1 and the calcined powder, collected from the oven and cooled to room temperature, was intimately mixed with Portland cement clinker (in a proportion of 1 part by weight of clinker per 5 parts by weight of calcined powder). Puddling water was added to the mixture obtained at a proportion of 30 ml of water per 100 g of the said mixture, with blending to form a homogeneous mortar. The latter was then shaped into small pellets which were stored under air for 5 days, to bring about setting and hardening of the mortar. The pellets collected after setting and hardening of the mortar were subjected to the TCLP toxicity test as in Example 1. To this end, the pellets were ground to less than 1 mm in diameter (diameter defined by screening) and 2 l of an aqueous solution containing 6 g of acetic acid and 2.57 g of sodium hydroxide per liter were added to 100 g of the ground material thus obtained. The mixture was homogenized and then filtered through a filter of 0.6 to 0.8 μm glass fibres and the filtrate was measured for its content of heavy metals from the powder subjected to the test. The results are given in Table 3 below.

TABLE 3

| Heavy metal | Content (μg/l) |
| --- | --- |
| Cu | 61 |
| Pb | <20 |
| Zn | 24 |
| Cd | 18 |
| As | <30 |
| Sb | <30 |
| Cr(VI) | 860 |

On comparing the results featured in Tables 2 and 3, the progress afforded by the invention, as regards rendering the heavy metals of the ash inert, is immediately apparent.

EXAMPLE 3

(In Accordance with the Invention)

In this example, the process was performed as in Example 2, but the pellets collected after setting and hardening of the mortar were subjected to a toxicity test different from the TCLP test. In this test, the pellets were ground to less than 1 mm (diameter defined by screening) and the ground material was subjected to leaching three times with demineralized water, in a liquid/solid ratio equal to 10.

After each leaching, the washing liquid was measured for its content of the heavy metals from the powder subjected to the test. The results are given in Table 4 below.

TABLE 4

| Heavy metal | Content (µg/l) |
|---|---|
| First leaching | |
| Cu | 63 |
| Pb | <20 |
| Zn | <10 |
| Cd | 60 |
| As | <30 |
| Sb | <30 |
| Cr(VI) | 700 |
| Second leaching | |
| Cu | 24 |
| Pb | <20 |
| Zn | <10 |
| Cd | 27 |
| As | <30 |
| Sb | <30 |
| Cr(VI) | 280 |
| Third leaching | |
| Cu | <10 |
| Pb | <20 |
| Zn | <10 |
| Cd | <10 |
| As | <30 |
| Sb | <30 |
| Cr(VI) | 35 |

EXAMPLE 4
(In Accordance with the Invention)

The test of Example 2 was repeated, under the same conditions, the only difference being that the Portland cement clinker was replaced with Portland cement.

The result of the TCLP test are given in Table 5.

TABLE 5

| Heavy metal | Content (µg/l) |
|---|---|
| Cu | <10 |
| Pb | <20 |
| Zn | <10 |
| Cd | <10 |
| As | <30 |
| Sb | <30 |
| Cr(VI) | 840 |

EXAMPLE 5
(In Accordance with the Invention)

The conditions of the test of Example 3 were repeated, the only difference being that the Portland cement clinker was replaced with Portland cement.

The results of the triple leaching test are given in Table 6

TABLE 6

| Heavy metal | Content (µg/l) |
|---|---|
| First leaching | |
| Cu | <10 |
| Pb | <20 |
| Zn | <10 |
| Cd | <10 |
| As | <30 |
| Sb | <30 |
| Cr(VI) | 1030 |

TABLE 6-continued

| Heavy metal | Content (µg/l) |
|---|---|
| Second leaching | |
| Cu | <10 |
| Pb | <20 |
| Zn | <10 |
| Cd | <10 |
| As | <30 |
| Sb | <30 |
| Cr(VI) | 160 |
| Third leaching | |
| Cu | <10 |
| Pb | <20 |
| Zn | <10 |
| Cd | <10 |
| As | <30 |
| Sb | <30 |
| Cr(VI) | 90 |

Second Series of Tests

In Example 6 to 17 whose description follows, ash having weight composition shown in Table 7 was treated.

TABLE 7

| Constituent | Content by weight |
|---|---|
| $SiO_2$ | 19.3% |
| Al (total) (expressed as $Al_2O_3$) | 13.6% |
| Al metal | 1–10% of total Al |
| CaO | 20.0% |
| MgO | 2.8% |
| Na | 7.5% |
| K | 6.1% |
| $TiO_2$ | 1.5% |
| FeO | 2.2% |
| Zn | 1.82% |
| Pb | 1.20% |
| Cu | 0.11% |
| Cd | 0.094% |
| Mn | 0.11% |
| Cr (total) | 0.04% |
| Cr(VI) | 0.33 ppm |
| Cl | 13.2% |
| $SO_3$ | 6.2% |
| $P_2O_5$ | 0.8% |
| As | 125 ppm |
| Sb | 510 ppm |
| Hg | 12 ppm |
| Noncombusted material | 2.4% |

EXAMPLE 6
(Not in Accordance with the Invention)

136 g of ash were washed with 1300 ml of water. After one hour, the pH of the reaction medium stabilized at 11.0. The aqueous suspension thus formed was filtered and the filter cake was collected, after having washed it beforehand with 100 ml of water.

The process was then performed as in Example 1. The results of the toxicity test (TCLP test) are given in Table 8 below.

TABLE 8

| Heavy metal | Content (µg/l) |
|---|---|
| Cu | 1200 |
| Pb | 1900 |
| Zn | 25000 |

TABLE 8-continued

| Heavy metal | Content (µg/l) |
|---|---|
| Cd | 500 |
| As | 1100 |
| Sb | 300 |
| Cr(VI) | 2300 |
| Hg | 20 |

EXAMPLE 7

(In Accordance with the Invention)

A batch of the ash defined in Table 7 was treated as in Example 6 and the calcined powder collected from the calcination oven and cooled to room temperature, was mixed with Portland cement clinker at a proportion of 1 part by weight of clinker per 4 parts by weight of calcined ash. Puddling water was added to the homogeneous mixture obtained, in an amount equal to 30 ml per 100 g of mixture, and the mixture was blended to form a mortar. The hydraulic mortar obtained was shaped into pellets which were stored under air for 5 days, to bring about setting and hardening of the mortar.

The pellets collected after setting and hardening of the mortar were subjected to the TCLP toxicity test. To this end, the pellets were ground to less than 1 mm in diameter (diameter defined by screening) and 2 l of aqueous 0.1 M acetic acid solution were added to 100 g of the ground material thus obtained. The mixture was homogenized and then filtered through a filter of 0.6 to 0.8 µm glass fibres and the filtrate was measured for its content of heavy metals from the powder subjected to the test. The results are given in Table 9 below.

TABLE 9

| Heavy metal | Content (µg/l) |
|---|---|
| Cu | 80 |
| Pb | <200 |
| Zn | 660 |
| Cd | 230 |
| As | 50 |
| Sb | 90 |
| Cr(VI) | 720 |
| Hg | <5 |

EXAMPLE 8

(In Accordance with the Invention)

The test of Example 7 was repeated, the only difference being that the TCLP toxicity test was replaced with the triple leaching test described in Example 3.

The results of the test are given in Table 10 below.

TABLE 10

| Heavy metal | Content (µg/l) |
|---|---|
| First leaching | |
| Cu | 38 |
| Pb | <20 |
| Zn | <10 |
| Cd | 17 |
| As | <30 |
| Sb | <30 |
| Cr(VI) | 145 |

TABLE 10-continued

| Heavy metal | Content (µg/l) |
|---|---|
| Second leaching | |
| Cu | 37 |
| Pb | <20 |
| Zn | <10 |
| Cd | 80 |
| As | <30 |
| Sb | <30 |
| Cr(VI) | 95 |
| Third leaching | |
| Cu | <10 |
| Pb | <20 |
| Zn | <10 |
| Cd | <10 |
| As | <30 |
| Sb | <30 |
| Cr(VI) | 55 |

EXAMPLE 9

(In Accordance with the Invention)

The test of Example 7 was repeated, the only difference being that the pellets obtained after puddling were stored in a hermetically closed chamber, filled with air saturated with water vapour (100% relative humidity) for 8 days. The pellets collected from the chamber were air-dried for two days and then subjected to the TCLP test of Example 8. In the TCLP test, the filtrate was found to have a hexavalent chromium content equal to 42 µg/l

EXAMPLES 10, 11 and 12

(In Accordance with the Invention)

These examples relate to three tests which were carried out under the same conditions as in Example 9, the only difference being that an additive was added to the puddling water. In the test of Example 10, this additive consisted of ferrous sulphate heptahydrate (used in an amount by weight equal to 1% of the weight of the mortar); in the test of Example 11, it consisted of manganous sulphate monohydrate (used in an amount by weight equal to 0.7% of the weight of the mortar); in the test of Example 12, it consisted of an iron powder (used in an amount by weight equal to 0.3% of the weight of the mortar).

In the TCLP test, the hexavalent chromium content in the filtrate was found to be less than 10 µg/l in each of the three examples.

EXAMPLES 13, 14, 15, 16 and 17

(In Accordance with the Invention)

The test of Example 9 was repeated with an amount of ash which was sufficient to be able to make the mortar into five 4×4×16 cm prismatic test pieces. The test pieces were kept for 28 days in an atmosphere saturated with water vapour, at room temperature, to bring about setting and hardening of the mortar. The five tests differed from each other in the weight ratios between the amount of ash and the amount of clinker used.

After setting and hardening of the mortar, the test pieces were subjected to a test of mechanical strength, which consisted in measuring their flexural strength and their compression strength under the conditions of Belgian standard NBN 196-1 (1991). The results of the tests are reported in Table 11 below.

TABLE 11

| Example No. | Ash:clinker (weight ratio) | Mechanical strength | |
|---|---|---|---|
| | | Flexion (N/mm$^2$) | Compression (N/mm$^2$) |
| 13 | 2.5 | 2.94 | 5.7 |
| 14 | 3.0 | 2.94 | 4.9 |
| 15 | 3.5 | 2.94 | 5.7 |
| 16 | 4.0 | 3.19 | 5.0 |
| 17 | 5.0 | 2.45 | 4.1 |

What is claimed is:

1. Process for rendering ash containing heavy metals and aluminium metal inert, the process comprising: adding a reactant selected from the group consisting of phosphoric acid and alkali metal phosphates to the ash, subjecting the phosphate-containing mixture thus obtained to puddling with water and a hydraulic binder so as to form a hydraulic mortar, and setting and hardening the mortar.

2. Process according to claim 1, characterized in that the reactant comprises sodium hexametaphosphate.

3. Process according to claim 1 characterized in that the hydraulic binder is selected from the group consisting of Portland cement and Portland cement clinker.

4. Process according to claim 1, characterized in that the reactant is used in an amount by weight of from 8 to 15% of the weight of the ash.

5. Process according to claim 1, characterized in that the hydraulic binder is used in an amount by weight of from 25 to 40% of the weight of the ash.

6. Process according to claim 1, characterized in that the setting and hardening are carried out under an atmosphere saturated with water vapour.

7. Process according to claim 1, characterized in that an additive selected from the group consisting of iron, manganese, iron(II) compounds, manganese(II) compounds and reductive salts of alkali metals is incorporated into the puddling water in an amount by weight of from 0.3 to 1% of the weight of the mortar.

8. Process according to claim 7, characterized in that the additive is selected from the group consisting of ferrous sulphate, manganous sulphate, sodium nitrite, sodium sulphite and iron metal.

9. Process according to claim 1, wherein the ash contains water-soluble compounds and the process further comprises subjecting the ash to washing with alkaline water before addition of the phosphoric acid thereto.

10. Process according to claim 1, wherein the ash contains organic and/or noncombusted material and the process further comprises subjecting the phosphate-containing mixture to calcination before the water and the hydraulic binder are added thereto.

11. Process according to claim 1, characterized in that the ash comprises fly ash from smoke originating from the incineration of urban waste.

* * * * *